UNITED STATES PATENT OFFICE.

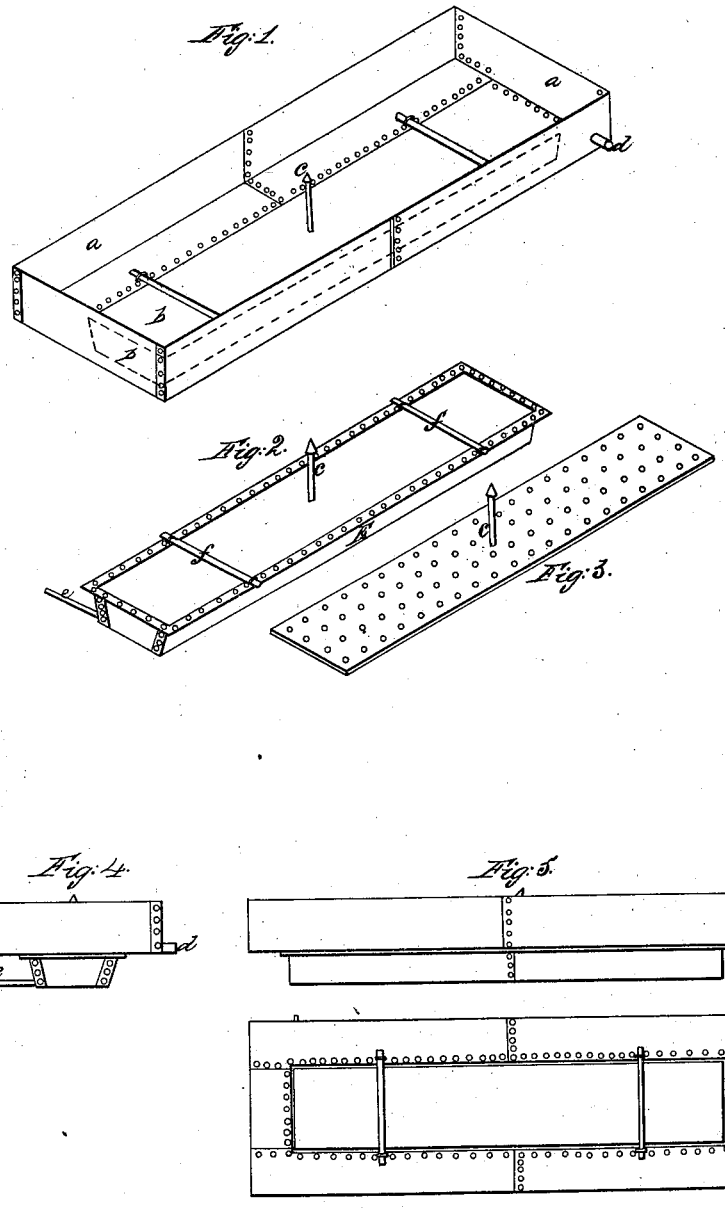

PHILIP PERDEW AND ALEXR. W. BRINKERHOFF, OF SYCAMORE, OHIO.

ASH-LEACHING APPARATUS.

Specification of Letters Patent No. 14,925, dated May 20, 1856.

*To all whom it may concern:*

Be it known that we, PHILIP PERDEW and ALEXANDER W. BRINKERHOFF, of Sycamore, in the county of Wyandot and State of Ohio, have invented a new and useful Machine or Apparatus for Extracting Lye from Ashes and for Other Purposes; and we hereby declare the following to be a full, clear, and exact description thereof, reference being made to the drawings herewith presented, which drawings constitute a part of said description.

Our invention consists chiefly in the peculiar form and arrangement of certain apparatus presently to be described, the object of which is first to dissolve and extract the alkali from the ashes, and secondly to concentrate the solution and thirdly to remove the ashes from the pan without the labor of shoveling, or other manipulation. By this mode of operation we render the whole one continuous process, instead of filling one panful of ashes steeping or boiling and then letting it cool down, and shoveling it out, which usually occupies one day, we are able to work over six panfuls per day without intermission and without interrupting the process of concentration. See the drawings.

Figure 1 is a perspective view of the machine being a pan or iron box ($a$) say 4 feet wide and twelve feet long and fourteen inches deep. In the bottom of this pan is attached a reservoir two feet wide and seven inches deep. An opening is left through the bottom of the pan corresponding to the length and breadth of the reservoir, which reservoir may be seen at Fig. 2. This opening between the pan and reservoir is covered with a wooden screen or plank perforated with holes and covered with two thicknesses of canvas. In the middle of this screen is fixed a tube two inches in diameter reaching to the top of the pan. Fig. 2 is a view of the reservoir detached from the pan having the screen attached in its top secured by two bars ($f$ and $f$.) At the bottom of this reservoir is attached the tube ($e$,) by which the concentrated lye is from time to time drawn off into the potash kettles. Fig. 3 shows the screen or perforated plank and tube ($c$.) Fig. 4 is an end view of the whole apparatus, Fig. 5 a side view or elevation and Fig. 6 a top view of the same.

A conductor or passage ($d$,) is seen in Fig. 4 through which the ashes are discharged after the alkali has been extracted.

To enable others to make and use our invention we proceed to describe our method and practice.

The pan ($a$,) is placed (with its reservoir attached) over an arch or fire grate and permanently fixed in masonry. The screen or filter is fixed in the top of the reservoir. The pan is filled to ⅔ds or ¾ths of its depth with ashes and water is let in. A fire is kindled on the grate. The lye then filters through the canvas or screen into the reservoir and is boiled down and concentrated. The steam escapes through the tube ($c$) into the pan and condensing runs down upon the ashes which are kept in constant agitation by the boiling produced in the pan. By the exposure of those portions of the bottom surface of the pan on each side of the reservoir, which it may be observed are two spaces one foot wide and extending the length of the pan over the fire.

Thus it may be seen that the latent caloric of the steam is again used in heating up the fresh charge of ashes and water, while the process of concentration goes regularly on instead of cooling down at each charge as in the old way, and the ashes being kept in constant ebullition in the water facilitates the dissolving of the alkali. The filter or screen of two thicknesses of canvas effectually prevents any ashes from passing in to the reservoir and the heavy concentrated lye from mixing with the lighter and weaker solution above in the pan.

When the strength of one charge of ashes is exhausted, a quantity of the concentrated lye is drawn from the reservoir and the passage ($d$,) is opened and by turning in the stream of fresh water the whole charge of ashes is run off; the passage is then closed and a new charge is placed in to the pan, and the whole process is repeated without intermission. Thus instead of one panful a day we are enabled to work six panfuls and the same may be continued through the night saving both time and labor.

We believe there is no method yet discovered which can compete with ours whether we regard time, labor, or the cost of fuel consumed.

We do not claim the boiling of ashes in a pan, neither do we intend to limit ourselves to the precise form and dimensions of the apparatus, for it is evident that they may both be slightly varied without altering the result; but

What we claim is—

1. The general plan and arrangement by which we are enabled to have one continued operation, instead of heating up for one charge, and cooling off and then shoveling out by hand.

2. We claim the pan (*a*) combined with its reservoir (Fig. 2,) immediately below it, having its opening through its bottom covered with grating and canvas or its equivalent, leaving a space on each side of the reservoir where the bottom shall be exposed to the fire, in order to keep the ashes in constant ebullition as before described, and having its conductor (*d*,) by which all the ashes may be discharged from time to time by the flowing of water without hand labor, (we hereby disclaim all pans, pots, or kettle, that do not answer this description) all arranged for the purposes and in manner substantially as afore set forth.

In testimony whereof we hereto subscribe in presence of witnesses.

PHILIP PERDEW.
ALEXANDER W. BRINKERHOFF.

Witnesses:
STEPHEN T. BOWERS,
JACOB B. WILSON.